R. SMITH.
ELECTRICAL TESTING APPARATUS.
APPLICATION FILED OCT. 20, 1919.
1,372,570.                                  Patented Mar. 22, 1921.
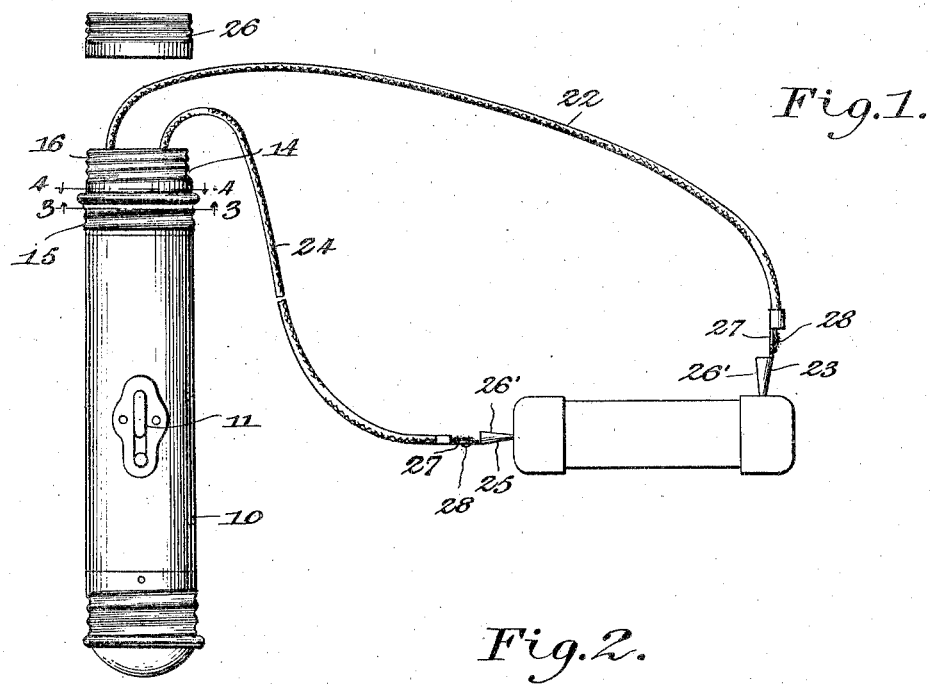
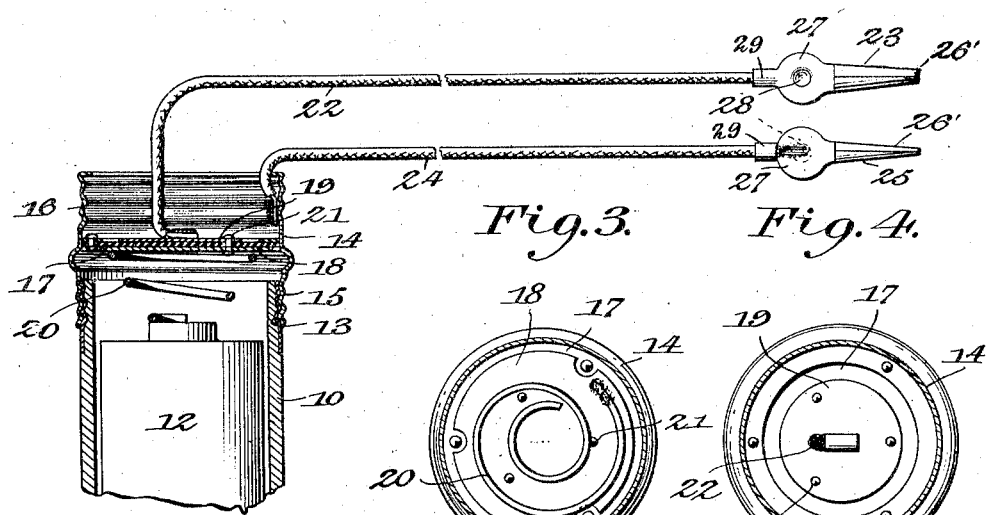
WITNESS:                                    INVENTOR.
                                         BY Raymond Smith.
                                            ATTORNEY.

UNITED STATES PATENT OFFICE.

RAYMOND SMITH, OF HAZARDVILLE, CONNECTICUT.

ELECTRICAL TESTING APPARATUS.

1,372,570.   Specification of Letters Patent.   Patented Mar. 22, 1921.

Application filed October 20, 1919. Serial No. 332,004.

*To all whom it may concern:*

Be it known that I, RAYMOND SMITH, a citizen of the United States, residing at Hazardville, in the county of Hartford and State of Connecticut, have invented new and useful Improvements in Electrical Testing Apparatus, of which the following is a specification.

This invention relates to an electrical testing apparatus and has particular reference to a testing device which is designed as an attachment for standard flash-lights now in general use and on the market.

One of the principal objects of the invention is to provide a simple, compact and practical testing apparatus, in the nature of an attachment for standard flash-lights, which includes testing points, so constructed as to constitute means for closing the flash-light circuit to permit of the use of the same in its usual capacity, said points being capable of separation when desired, for use as a testing apparatus for electrical circuits which carry no current.

With this and other objects in view, which will be more readily apparent as the nature, purpose and operation of the device is better understood from the following description and claims, reference is made to the accompanying drawings forming a part of the specification in which:

Figure 1 is a side elevation of a standard flash-light with the attachment applied thereto and illustrating one of its uses as a testing device.

Fig. 2 is a fragmentary vertical sectional view therethrough.

Fig. 3 is a sectional view on line 3—3 of Fig. 1.

Fig. 4 is a similar view on the line 4—4 of Fig. 1.

Fig. 5 is a sectional view through the test points when the same are nested to allow the flash-light to be used in its usual capacity.

Referring to the drawings by characters of reference 10 illustrates the shell or casing of a flash-light having the usual switch 11, and inclosing a battery 12. The shell or casing of the flash-light is threaded as at 13 for reception of the usual cap which covers its open end and through which the circuit is completed when the switch 11 is closed.

The attachment hereinafter described is designed to take the place of said cap and constitutes a testing apparatus which includes a cylindrical receptacle 14, threaded as at 15 and 16, the threads 15 being adapted to engage the threaded portion 13 of the shell. The receptacle is transversely divided by an insulating disk 17, to the opposite sides of which are riveted the metallic plates 18 and 19, the former having soldered or otherwise secured thereto a spring 20, said spring being adapted to engage one of the poles of the battery when the receptacle is properly positioned on the shell. Rivets 21 which secure the plates 18 and 19 to the disk 17, serve to electrically connect the plates to each other and secured to the plate 19 is a flexible conductor 22, to the extremity of which is attached the testing point 23. A second flexible conductor 24 is electrically connected to the receptacle 14, which in turn serves as a conductor for the current through the lamp to the opposite pole of the battery, owing to its engagement or contact with the shell of the flash-light, and to the extremity of the conductor 24 is attached a second testing point 25. A cap 26 is adapted to threadedly engage the threaded portion 16 of the receptacle to cover the same when the test points and conductors are nested in the upper portion thereof.

The testing points are constructed from a single piece of metal, the outer extremities of which are bent upon themselves to provide cones 26' and the remainders are in the nature of disks 27, which are centrally depressed as at 28. The inner ends of said disks are provided with lugs 29 adapted to embrace the conductors, the extremities of which are soldered or otherwise electrically connected thereto. The test points are of substantially identical formation and when the cone of one of the test points is fitted in the other, the depressed portions 28 interlock and coact with one another to prevent casual displacement, so that they may be nested within the receptacle together with the conductors and the cap applied in order to permit of the use of the flash-light in its usual capacity. When it is desired to use the device as a testing apparatus the cap 26 is removed and the test point separated; the switch 11 is then closed and the device is ready for use for testing purposes.

If a circuit or fuse plug is complete, the lamp will be energized when the test points are brought in proper contact therewith thereby readily informing the user of its condition. There are numerous and obvious other uses for which the testing device may be utilized but it is not thought that they need necessarily be herein set forth and therefore they have been omitted.

While a single and preferred embodiment of the invention has been described and shown, it is to be understood that various changes which fall within the scope of the claims may be resorted to when found expedient.

What is claimed as new is:

1. In a device of the class described, a member including insulated contacts, conductors connected with the contacts and interfitting separable devices carried by the conductors, each of said devices comprising a conical portion and an extrusion, the conical portion of one being adapted to fit into the conical portion of the other and the extrusion of one adapted to co-act with the extrusion of the other for locking the conical portions in engagement.

2. As a new article of manufacture, a metallic shell constituting a ground connection, a second connection insulated from said shell, conductors operatively secured to the connections and interfitting devices carried by the conductors and capable of separation.

3. The combination with a flash-light, of a testing apparatus comprising conductors operatively arranged in the flash-light circuit, and interfitting means respectively carried by the free ends of the conductors and normally completing the flash-light circuit, said means being capable of separation for testing purposes.

4. An electrical testing apparatus comprising a shell adapted to operatively engage the casing of a flash-light, means insulated therefrom and adapted to engage one of the battery poles, a conductor connected with said means, a second conductor connected with the shell, and interfitting separable testing points respectively carried by the free ends of the conductors.

5. A testing apparatus comprising a receptacle adapted to be operatively connected with the shell of a flash-light, a conductor insulated therefrom and operatively engaging one of the battery poles, a second conductor operatively connected with the receptacle, and interfitting testing points respectively carried by the free ends of the conductors, said testing points being capable of separation for testing purposes.

6. A testing apparatus comprising a casing having insulated contact devices adapted to be operatively connected with a flash-light circuit, conductors connected with said contact devices, and interfitting separable testing points connected with said conductors, each of said testing points comprising a conical portion and an extrusion, the conical portion of one being adapted to fit into the conical portion of the other and the extrusion of one adapted to co-act with the extrusion of the other for locking the conical portions in engagement.

In testimony whereof I have affixed my signature.

RAYMOND SMITH.